(12) United States Patent
Kuo (10) Patent No.: US 7,268,942 B2
(45) Date of Patent: Sep. 11, 2007

(54) METHOD OF MAKING A SELF-ALIGNED LIGHT GUIDE SCREEN

(75) Inventor: Huei-Pei Kuo, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 297 days.

(21) Appl. No.: 11/052,613

(22) Filed: Feb. 7, 2005

(65) Prior Publication Data

US 2006/0176552 A1  Aug. 10, 2006

(51) Int. Cl.
*G03B 21/56* (2006.01)
*H04B 10/12* (2006.01)
*G03H 1/00* (2006.01)
*G02F 1/35* (2006.01)
*F21V 9/00* (2006.01)
*F21V 7/04* (2006.01)
*F21V 17/00* (2006.01)
*G02B 6/26* (2006.01)
*G02B 6/42* (2006.01)
*G02B 6/02* (2006.01)
*G02B 6/10* (2006.01)

(52) U.S. Cl. .................. 359/443; 359/460; 359/341.1; 359/34; 359/332; 385/28; 385/50; 385/123; 385/146; 385/147; 362/556; 362/581; 362/511

(58) Field of Classification Search ................ 359/443, 359/460, 341.1, 34, 332; 385/28, 39, 50, 385/123, 146–147; 362/551, 554, 556, 581, 362/511
See application file for complete search history.

(56) References Cited

U.S. PATENT DOCUMENTS

| 4,116,739 A | 9/1978 | Glenn |
| 4,773,730 A * | 9/1988 | Sedlmayr .................. 385/137 |
| 4,929,048 A * | 5/1990 | Cuypers .................... 385/116 |
| 5,911,024 A | 6/1999 | Wallace |
| 6,571,043 B1 | 5/2003 | Lowry et al. |

\* cited by examiner

*Primary Examiner*—Diane Lee
*Assistant Examiner*—Magda Cruz

(57) ABSTRACT

Provided is a method of making a self-aligned light guide screen. More specifically, in a particular embodiment, fabrication may commence by providing a first ribbon section of light guides with at least one self alignment feature. A second ribbon section of light guides is provided with at least one self alignment feature configured to mate with the at least one self alignment feature of the first ribbon section. The ribbon sections are then stacked, the alignment features aligning the first and second ribbon sections.

36 Claims, 10 Drawing Sheets

METHOD OF MAKING A SELF-ALIGNED LIGHT GUIDE SCREEN

RELATED APPLICATION

This application is related to commonly owned U.S. patent application Ser. No. 10/698,829, filed on Oct. 31, 2003 by inventors Huei Pei Kuo, Lawrence M. Hubby, Jr. and Steven L. Naberhuis and entitled "Light Guide Apparatus For Use In Rear Projection Display Environments", herein incorporated by reference.

FIELD

This invention relates generally to the field of display devices and, in particular, to an improved method of making a self-aligned light guide screen.

BACKGROUND

Socially and professionally, most people rely upon video displays in one form or another for at least a portion of their work and/or recreation. With a growing demand for large screens and high definition television (HDTV), cathode ray tubes (CRTs) have largely given way to displays composed of liquid crystal devices (LCDs), plasma display panels (PDPs), and front and rear projection systems.

A CRT operates by scanning electron beam(s) that excite phosphor materials on the back side of a transparent screen, wherein the intensity of each pixel is commonly tied to the intensity of the electron beam. With a PDP, each pixel is an individual light-emitting device capable of generating its own light. With an LCD, each pixel is a transient light-emitting device, individually adjusted to permit light to shine through the pixel.

As neither system utilizes a large tube, LCD and PDP screens may be quite thin and often are lighter than comparable CRT displays. However, the manufacturing process for LCDs, PDPs, and most other flat panel displays is much more complex and intensive with respect to both equipment and materials than that of CRTs, typically resulting in higher selling prices.

Projection systems offer alternatives to PDP and LCD based systems. In many cases, projection display systems are less expensive than comparably sized PDP or LCD display systems. With a front projection system, the image is projected onto a screen from the same side as the viewer. If the viewer stands, sits or otherwise blocks the projection the image will be compromised. Front projection systems are therefore often suspended from the ceiling or mounted high upon a rear wall.

To accommodate the projector, one or more lenses, and reflectors, rear projection displays are typically 18 to 20 inches deep and not suitable for on-wall mounting. A typical rear projection system offering a 55-inch HDTV screen may weigh less than a comparable CRT, but at 200+ pounds it may be difficult and awkward to install and support.

Often, rear projection display devices exhibit average or below-average picture quality in certain environments. For example, rear projection displays may be difficult to see when viewed from particular angles within a room setting or when light varies within the environment. Aside from a theatrical setting, light output and contrast are constant issues in most settings and viewing environments.

Despite advancements in projectors and enhanced lens elements, the lens and reflector design remains generally unchanged and tends to be a limiting factor in both picture quality and overall display system thickness.

A developing variation of rear projection displays utilizes light guides, such as optical fibers, to route an image from an input location to an output location, and magnify the image. However, in certain configurations, light guide screens may lose a percentage of light and, thus, the brightness of the image, by permitting the light to venture off in directions other than substantially towards the viewing audience. This loss of light may in some instances amount to fifty percent (50%) of the light provided to the input ends of the light guides.

In addition, in some configurations, the viewing angle of the complete screen may be limited to the angular range corresponding to the acceptance angle of the light guides used in construction of the screen. With respect to light guides, the acceptance angle is the half-angle of the cone within which incident light is totally internally reflected by the fiber core. Further, this range of viewing angles may not be out in front of the screen, but may be more heavily concentrated to the right, left, top or bottom, depending on the direction the light guides approach the screen from behind.

Weight, thickness, durability, cost, aesthetic appearance, and quality are key considerations for rear projection display systems and display screens. As such, there is a need for some device to reduce this loss of light that is likely with a light guide screen.

Hence, there is a need for a fiber optic rear projection display device that overcomes one or more of the drawbacks identified above. And there is a need for a technique for fabricating this type of device.

SUMMARY

This invention provides a method of making a light guide screen.

In particular, and by way of example only, according to an embodiment of the present invention, this invention provides a method of making a self-aligned light guide screen including: providing a first ribbon section of light guides with at least one self alignment feature; providing a second ribbon section of light guides with at least one self alignment feature configured to mate with the at least one self alignment feature of the first ribbon section; and stacking the first and second ribbon sections, the alignment features aligning the first and second ribbon section.

DETAILED DESCRIPTION

Before proceeding with the detailed description, it is to be appreciated that the present teaching is by way of example, not by limitation. The concepts herein are not limited to use or application with a specific fiber optic rear projection display system. Thus, although the instrumentalities described herein are for the convenience of explanation, shown and described with respect to exemplary embodiments, it will be appreciated that the principles herein may be applied equally in other types fiber optic rear projection display systems.

Referring now to the drawings, the provided figures conceptually illustrate a method for making a self-aligned light guide screen. It will be appreciated that the described process need not be performed in the order in which it is herein described, but that this description is merely exemplary of one preferred process of one preferred method of making a self-aligned light guide screen 100.

Figure 1:
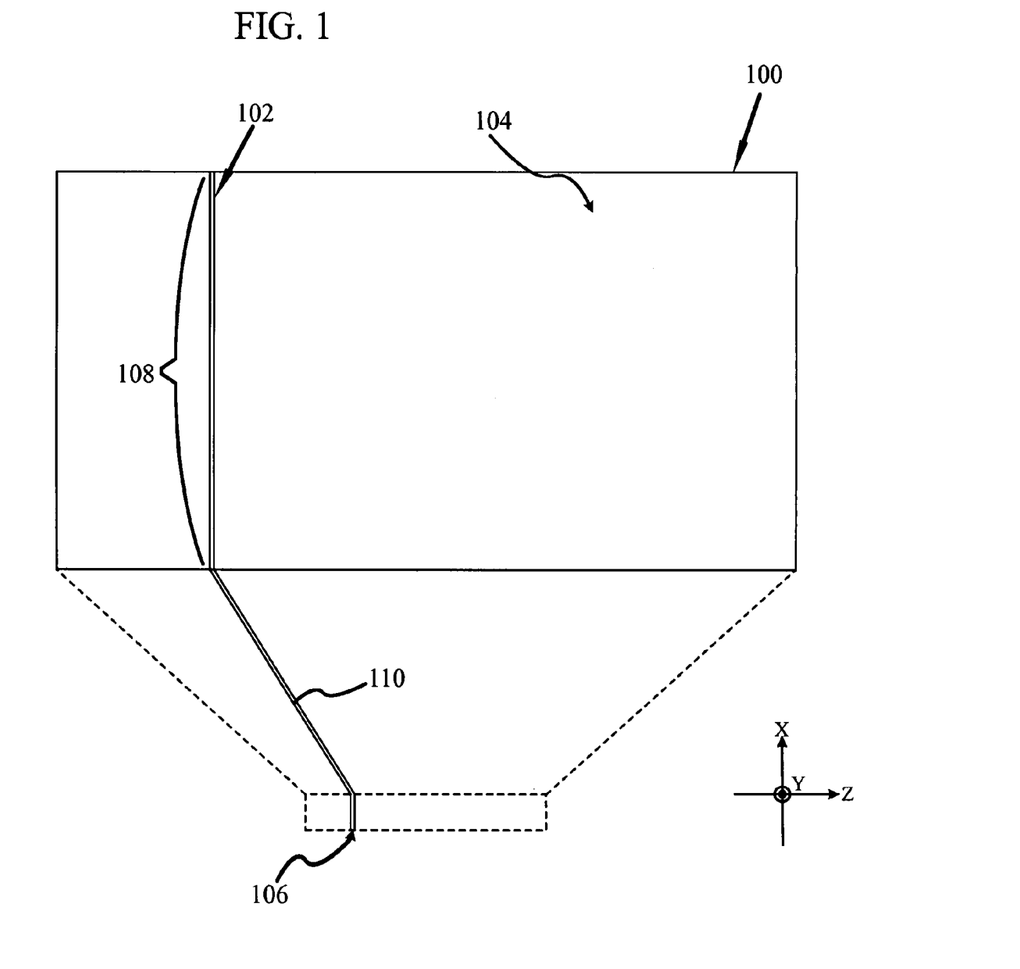
FIG. 1 shows a schematic diagram of an embodiment of a light guide screen.

To facilitate the description and inter-relation between figures, a coordinate system with three axes orthogonal to one another is provided as shown in FIGS. 1-7 and 9-12. The axes intersect mutually at the origin of the coordinate system which is intended to be the center of the via LGS 100. The axes in all figures are offset from their actual locations for clarity of illustration. Moreover, FIG. 1 is are understood to be a plan view of the LGS 100 according to the XZ-plane, and method of fabrication depicted in FIGS. 2-6 and 9 is rendered according to the YX-plane, with the stacking of fabricated ribbon sections in FIGS. 10 and 11 rendered according to the ZY-plane. FIG. 12 is again rendered according to the YX-plane with the indicated enlarged areas rendered generally in accordance with the ZY-plane.

In FIG. 1 there is shown a portion of a light guide screen (LGS) 100. In at least one embodiment wherein the light guides are optical fibers, LGS 100 may also be referred to as a fiber optic rear projection display. In at least one embodiment LGS 100 has a plurality of aligned magnifying layers 102 providing a viewing surface 104. Specifically, the magnifying layers 102 each provide an input location 106, a magnifying output location 108, and a flexible midsection 110.

To effectively establish the viewing surface 104 it is important that the magnifying layers 102 be properly aligned. More specifically, and as further discussed below, the input locations 106 should be properly aligned and the magnifying output locations 108 should be properly aligned. If either or both are misaligned with respect to each other, it is likely that the resulting image upon the viewing surface 104 will be distorted and/or even unacceptable to viewers. In addition, in at least one embodiment, it is desirable for the magnifying layers 102 to be substantially similar.

With respect to an overview of the method of making as illustrated in FIGS. 2 through 9, in at least one embodiment the method of making a self-aligned LGS 100 includes providing a first ribbon section of light guides with at least one alignment feature and providing a second ribbon section of light guides with at least one alignment feature configured to mate with at least one alignment feature of the first ribbon section. The ribbon sections are stacked, the alignment features aligning the first and second ribbon sections.

Figure 14:
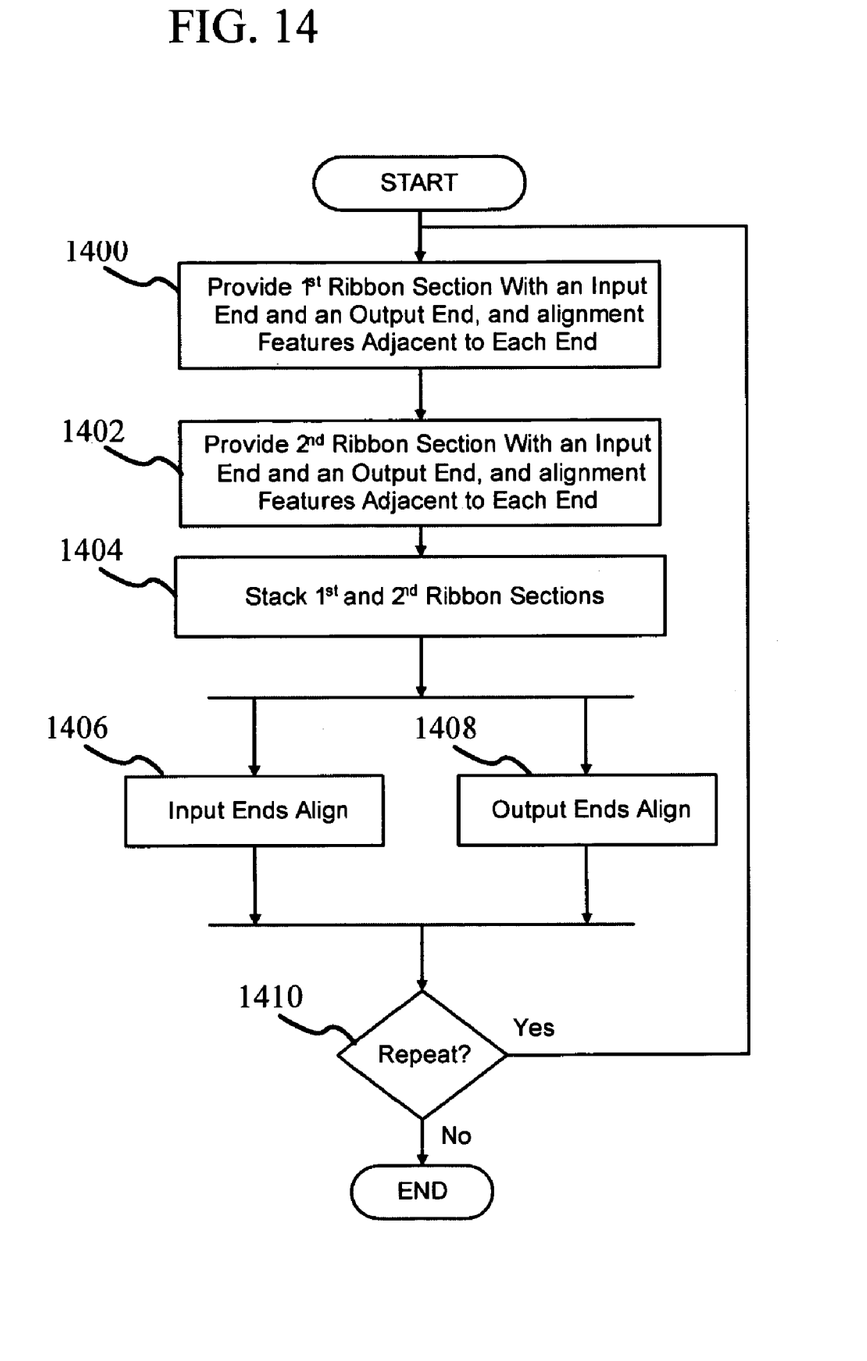
FIG. 14 is a high-level flowchart of at least one method embodiment.

More specifically, and with respect to the flowchart of FIG. 14, in at least one embodiment, the method of making a self-aligned LGS 100 includes providing a first ribbon section with an input end and an output end, and at least one physical alignment feature disposed adjacent to each end, block 1400. A second ribbon section with an input end and an output end, and at least one physical alignment feature disposed adjacent to each end is also provided, block 1402.

The at least one physical alignment feature adjacent to the output end of the second ribbon section is configured to mate with the at least one physical alignment feature adjacent to the output end of the first ribbon section. The ribbon sections are stacked, block 1404. The alignment features align the first and second ribbon sections, block 1406, 1408. The alignment process has been illustrated as a parallel operation. Indeed, the process of providing each ribbon section may also be performed in parallel. So as to provide an LGS 100 having more than two ribbon sections, the process is repeated, decision 1410 until an appropriate number of ribbon sections have been provided and stacked.

It will be understood and appreciated that a variety of different fabrication methods may be employed. For example, a sufficient number of ribbon sections may be fabricated before stacking commences, or ribbon sections may be fabricated and stacked in an alternating process. Multiple ribbon sections may be fabricated and then stacked before another multiple set of sections is provided.

Figure 2:
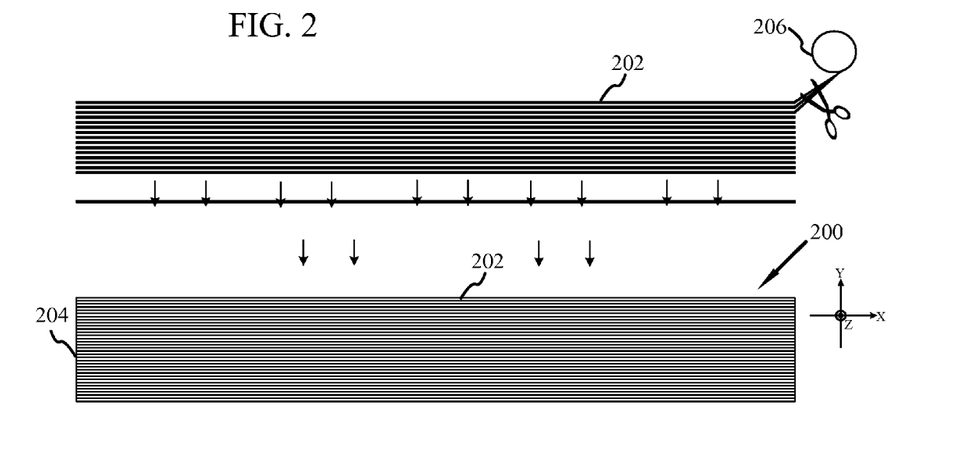
FIG. 2 conceptually illustrates making a light guide ribbon from a plurality of light guides.

As shown in FIG. 2, in at least one embodiment the fabrication process may be commenced by providing a ribbon 200 of individual light guides 202. The ribbon may be pre-fabricated, or assembled by drawing multiple light guides 202 together from one or more light guide storage devices, such as spools 206. If drawn from a continuous source such as spool 206. It is understood and appreciated that the light guides 202 are cut to some operator determined length. The light guides may also be provided by a light guide provider such as, for example, a polymer extrusion apparatus. Preferably, the ribbon is one light guide 202 thick. The number of light guides 202 placed side by side to establish ribbon 200 is a matter of desired screen resolution. Although, spool 206 is illustrated as supplying a single light guide 202. It is understood and appreciated that in at least one embodiment, spool 206 provides multiple light guides 202 as a ribbon, and that in at least one embodiment, this spool provided ribbon, when cut is ribbon 200.

With respect to the summary overviews provided above, in one embodiment, the ribbon sections are fabricated in pairs from sections of ribbon 200. In at least one alternative embodiment, the ribbon sections are fabricated in sequence directly from the ribbon 200. Each of these embodiments will now be discussed.

Figure 3:
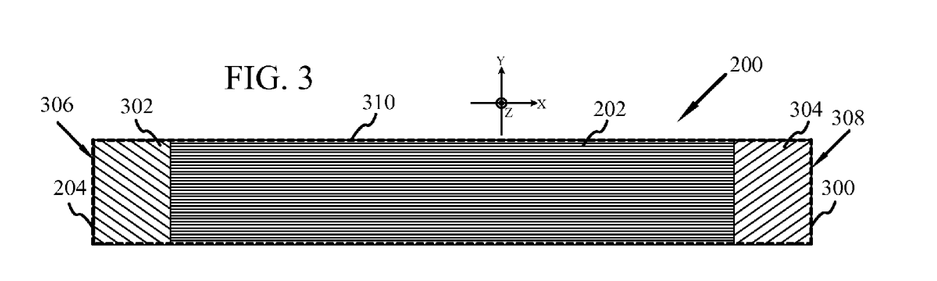
FIG. 3 through FIG. 6 conceptually illustrate an embodiment of forming two ribbon sections.

FIGS. 3~6 illustrate the processing steps in one embodiment where the ribbon sections are fabricated in pairs from section of ribbon 200. Whereas FIG. 2 shows the ribbon 200 being formed from light guides 202 drawn from one or more spools 206, ribbon 200 may also be provided as a continuous ribbon from a continuous source. In at least one embodiment, the continuous source is a one or more supply spools 208, see FIG. 2. Other continuous sources, such as, but not limited to, an extrusion system or embossing system may also be used. As shown in FIG. 3, ribbon 200 has a first end 204. If ribbon 200 is being provided as a continuous ribbon from one or more supply spools, a second end 300, opposite from the first end 204 is established at a predetermined distance from the first end 204.

An appropriate bonding agent such as, for example, glue 302, is applied to the first end 204 to create bonded first end 306. Specifically, the glue 302 is applied in a sufficient quantity to bind the light guides 202 together with a final thickness about the same as an individual light guide 202. In at least one embodiment, glue 302 is not run continuously over the ribbon 200 from first end 204 to second end 300; rather, it is applied over an area proximate to the first end 204 sufficient to establish at least one self alignment feature.

In a similar process, a bonding agent such as, for example, glue 304, is applied to the second end 300 to create bonded second end 308. Specifically, the glue 304 is applied in a sufficient quantity to bind the light guides 202 together to form a bonded total thickness about the same as an individual light guide. Substantially matching the first end 204, glue 302 is applied over an area proximate to the second end 300 sufficient to establish at least one alignment feature. In at least one embodiment, in addition to glues 302 and 304, a thin layer of material (not shown) may be bonded over the first and second ends 204, 300. As is appreciated with respect to the figures, the ribbon 200 lies in a plane, e.g. the YX-plane as shown. The light guides of the ribbon define a perimeter 310. This perimeter 310 extends perpendicularly from the plane of the ribbon 200.

Figure 4:
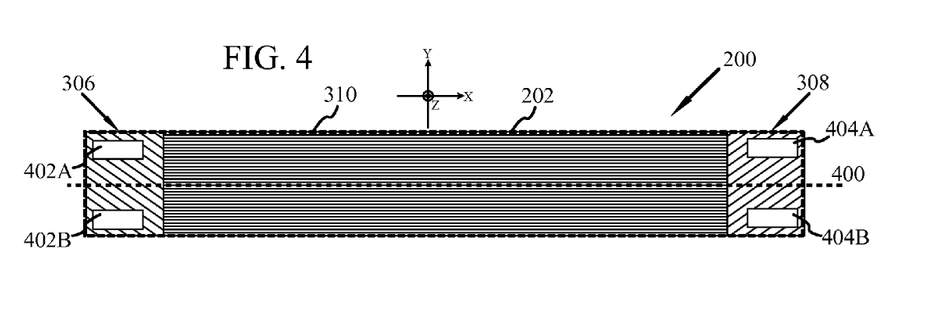

As shown in FIG. 4, ribbon 200 has a longitudinal centerline 400. To establish a device for vertical alignment and curtail the chance for rotation about longitudinal centerline 400, in at least one embodiment, the alignment features may be referred to as alignment guides 402, 404 provided in both first end 204 and second end 300, respectively. More specifically, as shown in FIG. 4, two alignment holes 402A, 402B are established on opposing sides of centerline 400 in bonded first end 306.

A matching set of alignment holes 404A, 404B are established in bonded second end 308. As shown and described in further detail below, in at least one embodiment, alignment holes 402A, 402B, 404A, 404B are rectangular. Although illustrated as holes, alignment guides may be holes, mating bumps and dimples, and combinations thereof. In addition, alignment holes 402A, 402B need not be the same size and shape. It is also appreciated that alignment holes 402A, 402B, 404A and 404B are within the perimeter 310 of the ribbon 200.

Figure 5:
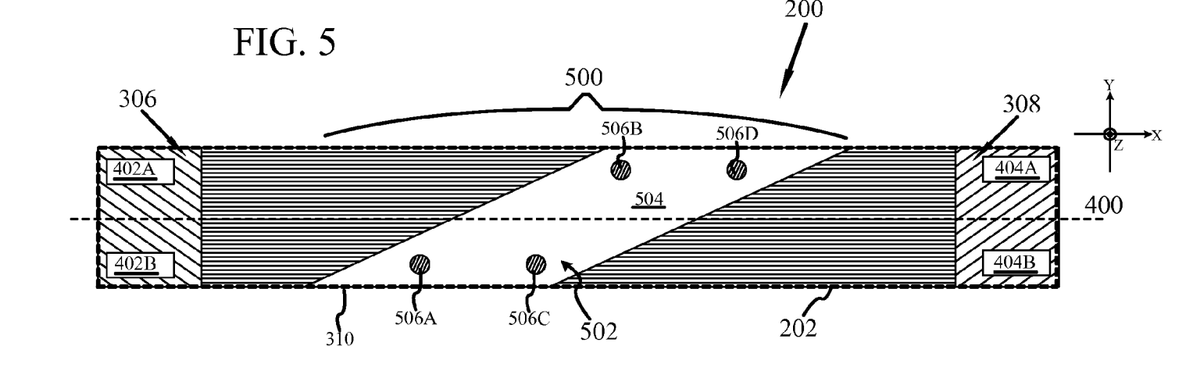

Between first end 204 and second end 300 is ribbon midsection 500, as shown in FIG. 5. Although the plurality of light guides 202 need not be bonded together continuously from first end 204 to second end 300, at least a section of the light guides 202 between first end 204 and second end 300 are bonded together with an appropriate bonding agent such as, for example, glue, to establish a bonded area, identified as bonded midsection 502.

The bonded midsection 502 provides at least one self alignment feature. More specifically, the bonded midsection 502 provides at least one physical alignment feature 506. Further, in at least one embodiment, physical alignment features 506 are provided on the top and bottom of bonded midsection 502. It is understood and appreciated that bonded midsection 502 may exist equally disposed between first end 204 and second end 300, or it may be disposed closer to one end or the other.

In at least one embodiment, at least one spacer is also bonded across the same area of bonded midsection 502. As FIG. 5 provides a top view, a first bonded spacer 504 is shown. First spacer 504 may be bonded at an angle other than perpendicular to longitudinal centerline 400. To limit waste, reduce excess material and reduce weight, in at least one embodiment, first spacer 504 is an appropriately sized and shaped parallelogram across bonded midsection 502.

In at least one preferred embodiment, a second spacer (not shown in FIG. 5; see FIG. 11 for second spacer 1100) of substantially the same shape as first spacer 504 is bonded to the ribbon midsection 502 opposite from and in alignment with first spacer 504. In other words, first spacer 504 may be considered a top spacer and second spacer 1100 may be considered a bottom spacer. Together, first spacer 504, second spacer 1100 and ribbon 200 provide a bonded stack. In an alternative embodiment, the bottom spacer may be omitted.

Figure 11:
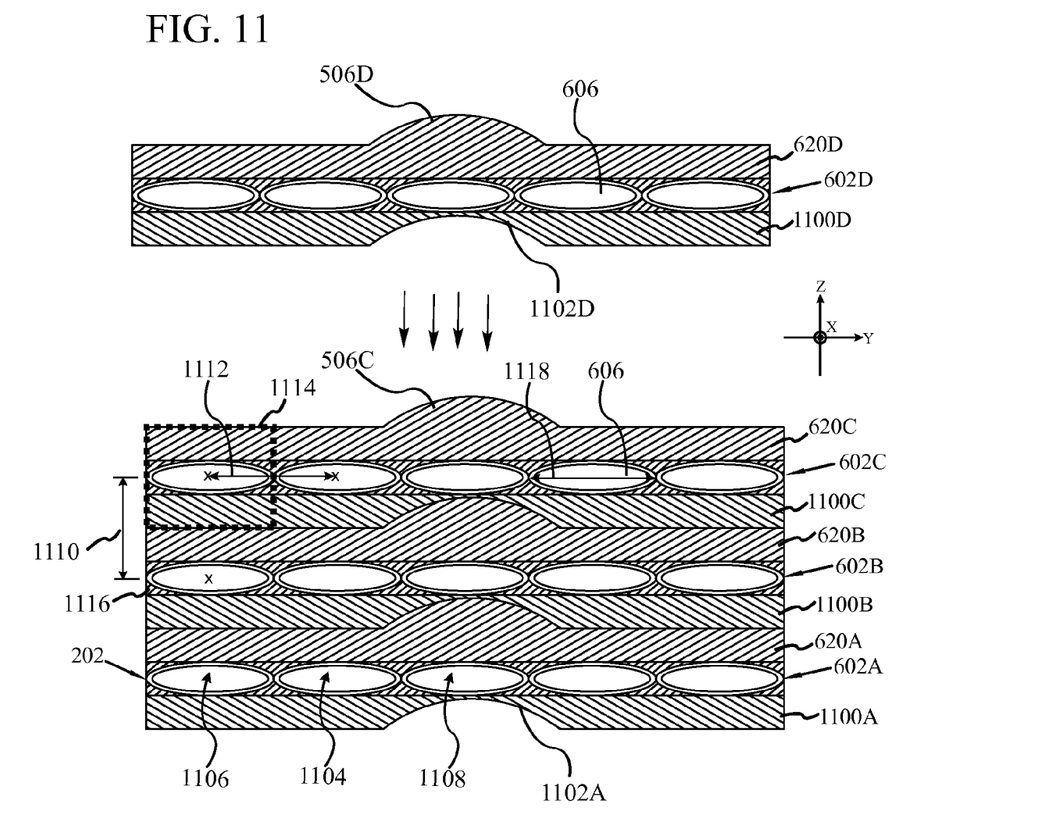
FIG. 11 is an end, cross-sectional view proximate to the output section of stacked ribbon sections.

As shown in FIG. 5, first spacer 504 provides at least one physical alignment feature 506. In at least one embodiment, first spacer 504 provides four physical alignment features 506A, 506B, 506C, 506D, symmetrically located. Paralleling first spacer 504, second spacer 1100 provides at least one physical alignment feature 1102, as well. As shown in FIG. 11, the alignment features 1102 of second spacer 1100 are configured to mate with alignment features 506. More specifically, alignment features 1102 are appropriately sized to mate with physical alignment features 506. Further, in at least one embodiment, the physical mating alignment features 506, 1102 are self locking.

As shown in FIG. 5, physical alignment features 506 are disposed upon ribbon 200 and spacer 504 is sized to lie flush to the edges of ribbon 200. In at least one embodiment, spacer 504 may extend beyond the edges of ribbon 200. Further still, alignment features 506 may be disposed upon the extended ends of spacer 504 such that alignment features 506 are not directly above light guides 202.

Figure 6:
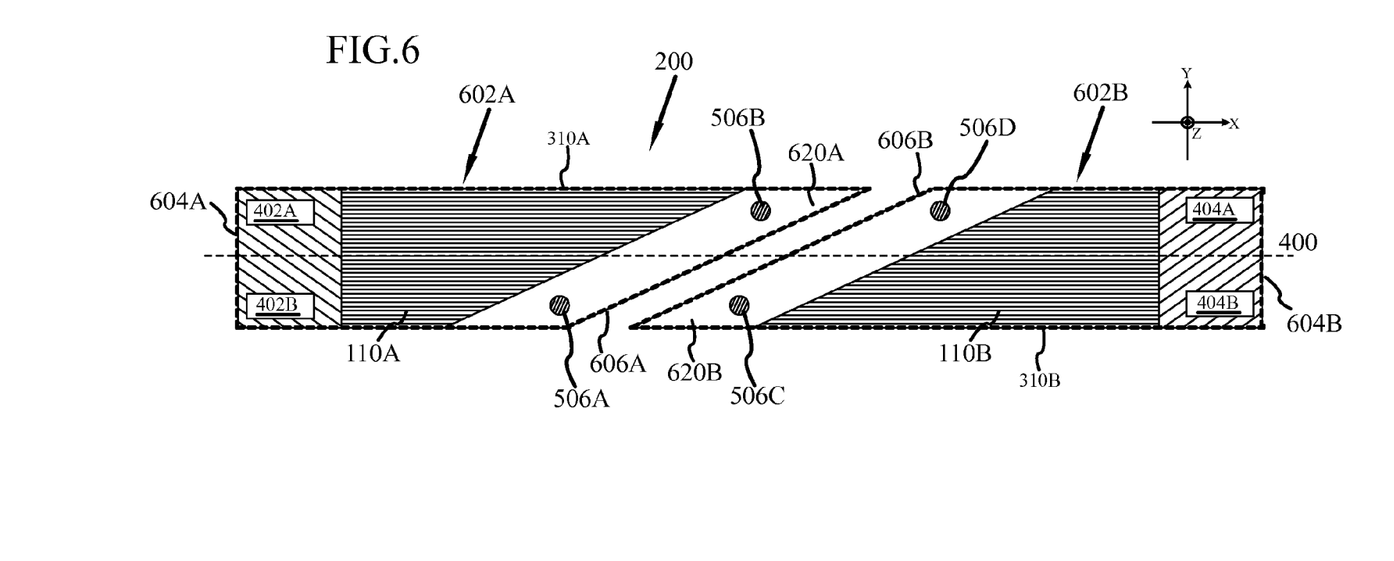

As shown in FIG. 6, ribbon 200 is severed through the bonded midsection 502, and at least one spacer (top spacer 504 shown) relative to longitudinal centerline 400. So as to provide a magnification property, further discussed below, in at least one embodiment, ribbon 200 is severed at an angle acute to the longitudinal centerline 400. In an alternative embodiment ribbon 200 is severed at an angle substantially transverse to longitudinal centerline 400. Moreover, ribbon 200 is cut at an angle of between about zero (0) and ninety (90) degrees relative to the longitudinal centerline.

A cut at other than 90 degrees establishes an output end for each light guide 202 that is angled. The output ends for each light guide 202 may not require further cleaning or polishing.

Further, this cutting establishes two ribbon sections 602A, 602B. In addition, this cut divides first spacer 504 in two, with one half remaining on each ribbon section 602A, 602B. For ribbon section 602A, this is identified as top spacer 620A, and for ribbon section 602B this is identified as top spacer 620B. Likewise bottom spacer (not shown) is also divided in two with one half remaining on each ribbon section 602A and 602B respectively. As shown, it is understood and appreciated that physical alignment features 506 remaining are within the perimeter defined by the light guides of each ribbon section, e.g. alignment features 506A and 506B are within the perimeter 310A of light guide ribbon section 602A and alignment features 506C and 506D are within the perimeter 310B of the light guide ribbon section 602B.

In an embodiment where a single physical alignment feature is provided, cutting ribbon 200 will divide the at least one physical alignment feature as well. As is illustrated in the accompanying figures, it may be preferred to provide a plurality of physical alignment features symmetrically disposed to the intended cut line through the bonded midsection 502. The provided self alignment features are configured such that when the bonded area is cut and the alignment features thus divided, the at least one alignment feature remaining on one side of the cut (i.e. ribbon section 602A) will mate with the at least one alignment feature remaining on the other side of the cut (i.e., ribbon section 602B).

Ribbon section 602A has alignment holes 402A, 402B proximate to input end 604A, and physical alignment features 506A, 506B proximate to output end 606A. The input end 604A may be considered the first end and the output end 606A may be considered the second end. Ribbon section 602B has alignment holes 404A, 404B proximate to input end 604B, and physical alignment features 506C, 506D proximate to output end 606B.

In at least one embodiment, flexible midsections 110A, 110B exist between respective input ends 604A, 604B and output ends 606A, 606B of ribbon sections 606A, 606B. Moreover, in at least one embodiment ribbon section 602B is a substantially identical twin of ribbon section 602A, rotated one-hundred-eighty degrees. In at least one alternative embodiment, while the input ends 604A, 604B and output ends 606A, 606B are substantially identical, the length of each ribbon's midsection 110A, 110B may be different. As the ribbon sections 602A, 602B are to be stacked, varying the lengths of the midsection 110A, 110B may be preferred so as to eliminate the bunching of excess material and/or facilitate the ease of the stacking process.

With respect to the above described activities, it is a matter of fabrication preference whether the activities are combined. More specifically, the light guides of the ribbon may be bonded and cut in substantially contemporaneous operations. Providing the alignment holes 404A, 404B and severing the ribbon through the bonded midsection 502 may also occur as substantially contemporaneous operations.

Figure 7:
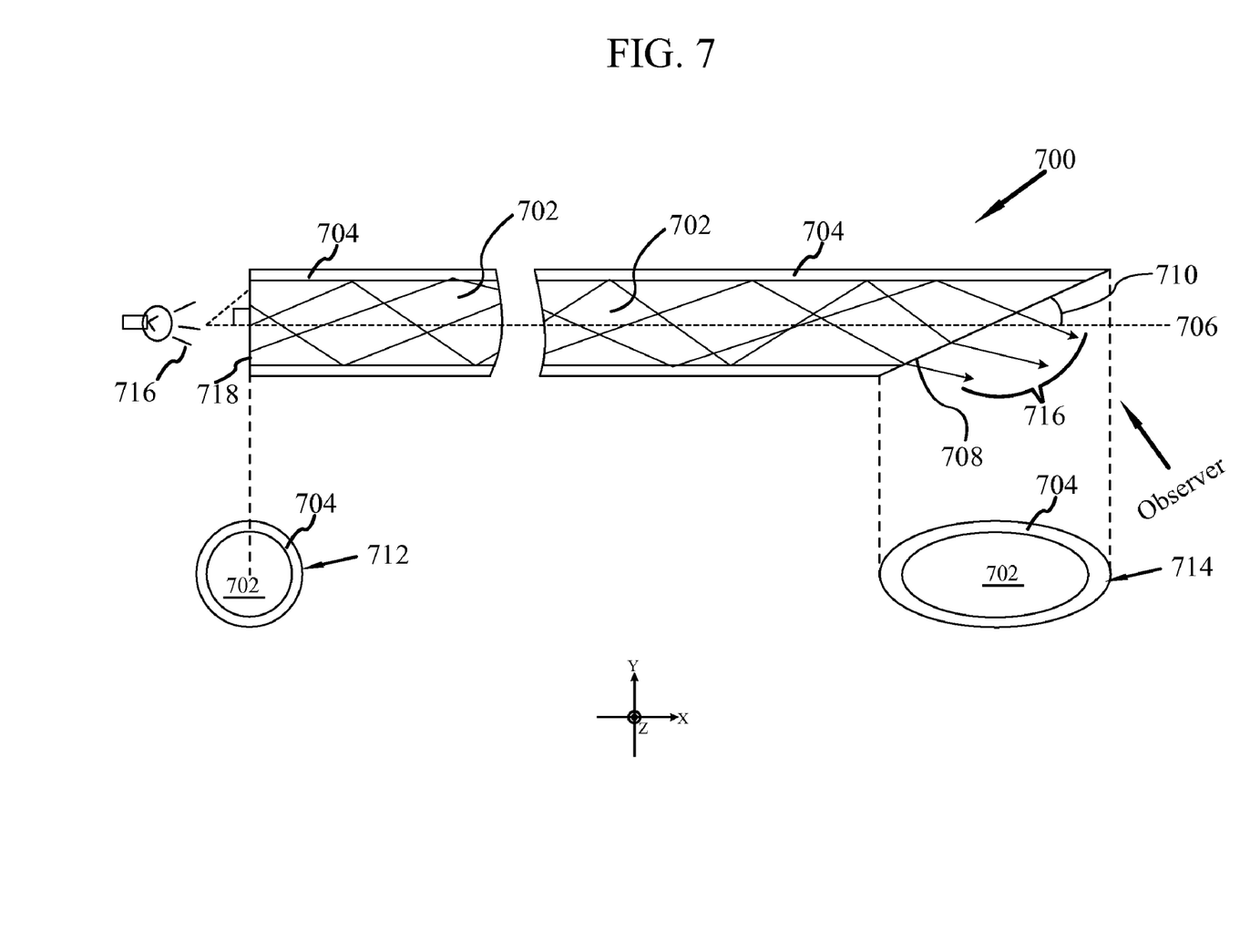
FIG. 7 is an enlarged cross-section of an optical fiber serving as a light guide in an embodiment.

In at least one embodiment, the light guides 202 are cladded optical fibers, each substantially identical and having a round cross-section. It is understood and appreciated that the clad is made of a material with a lower index of refraction than the core. FIG. 7 is an enlarged cross-section of a single optical fiber 700 as used in ribbon sections 602A, 602B.

Each optical fiber 700 has a longitudinal light guide core 702 and an external circumferential cladding 704. In at least one alternative embodiment, optical fibers 202 may have cross-sections relating to a square, triangle, octagon or other polygon. In such instances where alternatively shaped optical fibers 202 are employed, the term diameter may be inapplicable, and terms such as, for example, vertical cross distance and horizontal cross distance may be used.

It is of course realized that optical fiber 700 may bend, coil or otherwise contour such that longitudinal centerline 706 is not always a straight line. Optical fiber 700 is shown with core 702 symmetric about longitudinal centerline 706 for ease of discussion and illustration.

In at least one embodiment, output end 708 is angled relative to longitudinal core 702, at angle 710. In at least one embodiment, the input end 718 of optical fiber 700 will be perpendicular to the longitudinal core 702. As such, the horizontal width of input end 718 is not as great as the horizontal width of output end 708. In the embodiment shown, input end 718 is substantially circular, illustrated by cross-section 712, while the output end 708 is substantially elliptical, illustrated by cross-section 714.

In at least one embodiment, the magnification quality of magnifying output end 708 is about a factor of ten over the input end 718. More specifically, the acute angle for cutting is pre-determined to provide a known magnification property to the output end of each ribbon section.

In at least one embodiment, the core 702 is formed of a generally optically clear plastic or plastic-type material, including but not limited to a plastic such as acrylic, Plexiglas, polycarbonate material and combinations thereof. The material used to construct the core 702 may or may not be polarized, as the presence or absence of polarization may benefit particular embodiments.

In at least one embodiment, each optical fiber 700 is preferably substantially totally internally reflecting such that the light, illustrated as lines 716, received at the input end 718 within a maximum divergence angle is substantially delivered to the magnifying output end 708 with minimal loss. Cladding 704 is a material having a refraction index lower then that of the core 702. Total internal reflection, or TIR, is the reflection of all incident light off the interface of the core and the clad. This interface may also be referred to as the boundary. TIR only occurs when a light ray impinges upon the boundary from the medium and the angle of incidence for the light ray is greater than the "critical angle." The angle is measured with respect to the normal of the boundary surface between the core and the clad.

The critical angle is defined as a the angle of incidence which provides an exit angle of refraction of 90 degrees when the light impinges on the boundary from the side of the denser medium (side with the higher index of refraction). For any angle of incidence greater than the critical angle, the light traveling through the denser medium (medium with a higher index of refraction) will undergo total internal refraction. The value of the critical angle depends upon the combination of materials present on each side of the boundary.

As the input/output ends of ribbon section 602B are substantially identical to those of ribbon section 602A, the ribbon sections may be similarly oriented and stacked. As the ribbon sections may be cut at various locations, ribbon sections of different lengths may be selected to fit different sections of the screen.

Figure 8:
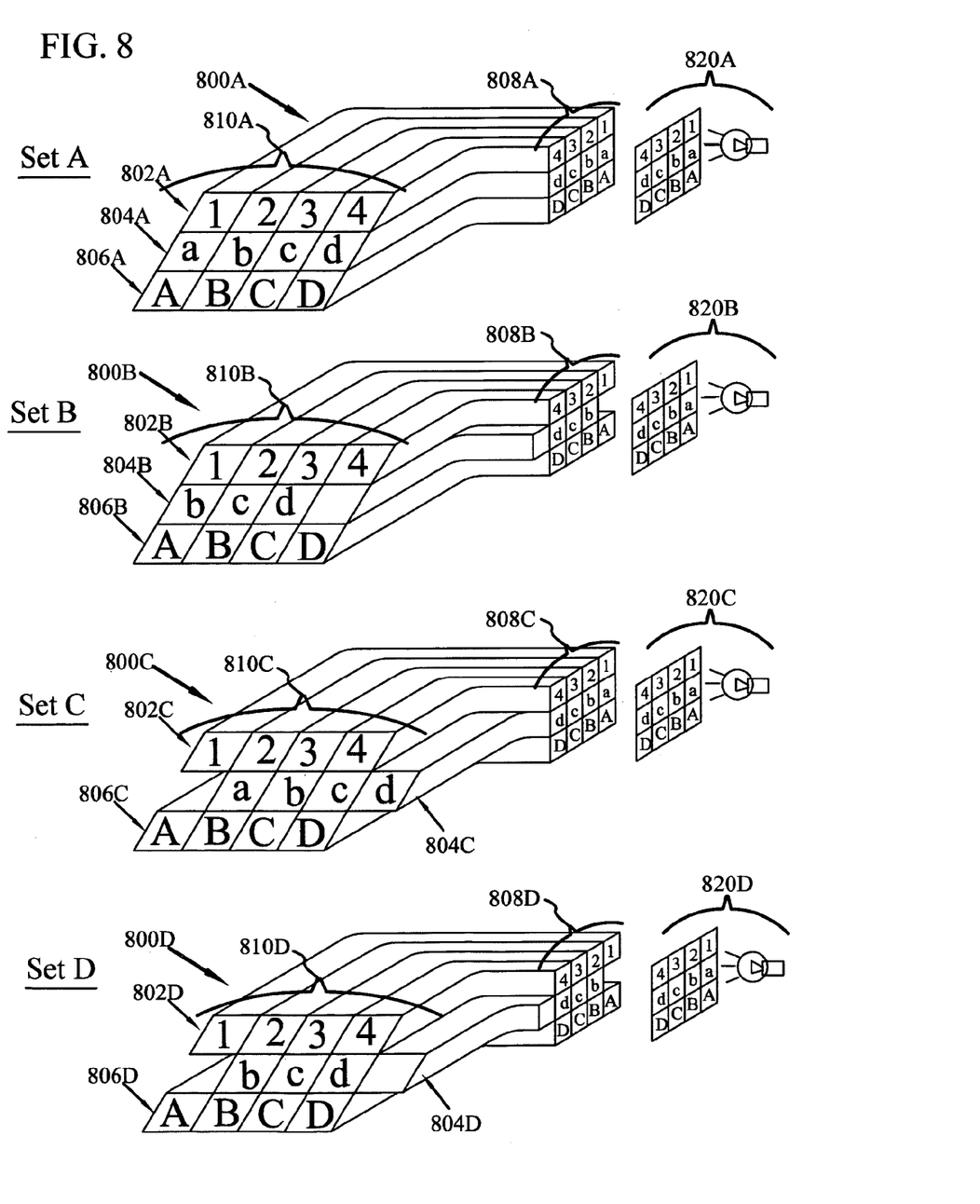
FIG. 8 conceptually illustrates alignment issues between layers of ribbon sections.

FIG. 8 is a conceptual representation of alignment issues. For simplicity of illustration and discussion, with respect to FIG. 8, the four sets 800A, 800B, 800C, 800D of ribbon sections do not show spacers, cladding, bonding materials or the self alignment features discussed above. In addition, whereas the above figures illustrate the ribbon sections as flat and unbent, in the perspective views of FIG. 8, the ribbon sections are shown bent so as to show the relative effect of alignment issues between input ends 808 and magnifying output ends 810.

Set 800A includes stacked ribbon sections 802A, 804A, 806A. Set 800B includes stacked ribbon sections 802B, 804B, 806B. Set 800C includes stacked ribbon sections 802C, 804C, 806C. Set 800D includes stacked ribbon sections 802D, 804D, 806D. Each set 800A~D has an input end 808A~D, and a magnifying output end 810A~D, respectively. Image source 820 provides the same image to the input end 808A~D of each set 800A~D.

As shown for set 800A, proper alignment at input end 808A yields proper alignment of the image at output end 810A. Set 800B illustrates misalignment of input end 808B and the corresponding misalignment of the image at output end 810B. Set 800C illustrates image misalignment at output 810C despite proper alignment at input end 808C. Set 800D illustrates image alignment as input ends 800D and output ends 810D have matching misalignment. Moreover, if either or both the input ends 808 and output ends 810 are misaligned with respect to each other, it is likely that the resulting image will be distorted.

Figure 9:
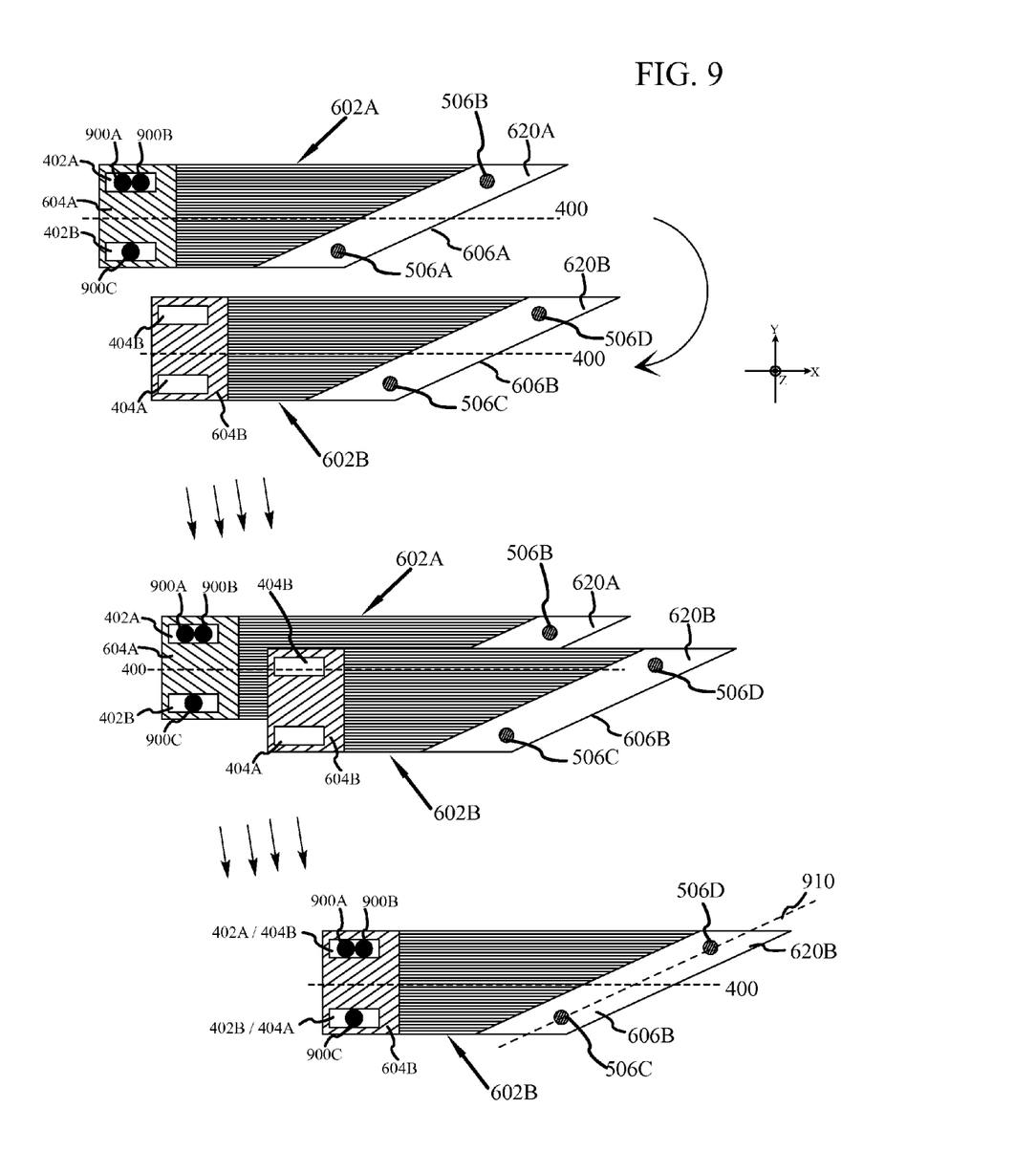
FIG. 9 conceptually illustrates stacking the ribbon sections.

As shown in FIG. 9, in at least one embodiment, input ends 604A, 604B are aligned with the use of alignment pins 900A, 900B, 900C. More specifically, ribbon section 602A is positioned such that alignment pins 900A, 900B pass through alignment hole 402A and alignment pin 900C passes through alignment hole 402B.

In at least one embodiment, alignment holes 402A, 402B, 404A, 404B are rectangular and alignment pins 900A~C are substantially cylindrical and substantially identical. As shown, the diameter of each alignment pin 900A~C is about the same as the width of rectangular alignment holes 402A, 402B.

The length of rectangular alignment holes 402A, 402B is greater than the combined diameters of alignment pins 900A, 900B; as such, it is possible for ribbon section 602A to slide in the direction along longitudinal centerline 400. This accommodates the slight differences in the length of the ribbons 602A and 602B due to, e.g. manufacturing tolerances. The use of three alignment pins 900A~C substantially prevents the ribbon section 602A from rotating about longitudinal centerline 400.

Ribbon section 602B is then positioned such that alignment pins 900A, 900B pass through alignment hole 404A and alignment pin 900C passes through alignment hole 404B. Ribbon section 602B may move along the centerline 400 relative to ribbon section 602A; however, the light guides comprising each ribbon section will remain aligned in the direction perpendicular to centerline 400. In at least one preferred embodiment, the output ends are self-aligned by interlocking alignment features 506 and 1102 as shown in FIG. 11 and described in more details below.

It is understood and appreciated that in at least one embodiment, a plurality of first and second ribbon sections 602A, 602B are made prior to stacking the ribbon sections. As stated above, although first and second ribbon sections 602A, 602B have substantially identical input ends 604 and output ends 606, the length of each ribbon midsection may be different to facilitate stacking, as different sections of the LGS screen accommodate different lengths of ribbons. For fabrication simplification, it may be desirable to provide all of the ribbon sections 602 before commencing with the stacking procedure, so as to efficiently arrange the varying lengths of first and second ribbon sections 602A, 602B.

Figure 10:
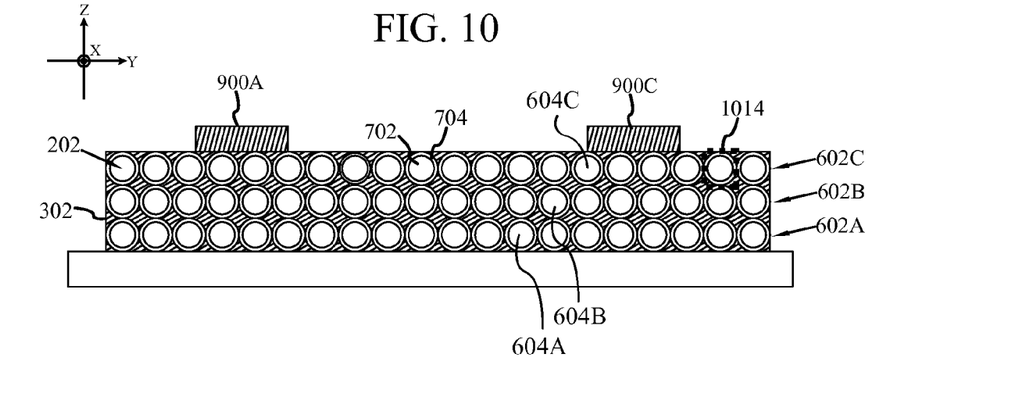
FIG. 10 is an end view of the input ends of stacked ribbon sections.

FIG. 10 provides an end view of the input ends 604A, 604B, 604C for three ribbon sections 602A, 602B, 602C vertically aligned by alignment pins 900A~C. Alignment pin 900B is not shown as it is in line with alignment pin 900A. The location of glue 302 binding light guides 202 together is also shown. For each light guide, core 702 and cladding 704 are illustrated.

FIG. 11 is a partial cross-section end view of three stacked ribbon sections (602A, 602B, 602C) and one additional ribbon section 602D being added. The end view of each ribbon section is along dashed line 910 imposed upon ribbon section 602A running parallel to aligned output ends 606B in the bottom most illustration of FIG. 9. As shown, physical alignment feature 506C on the top spacer 620C of ribbon section 602C is pre-positioned and aligned to mate with corresponding alignment feature 1102D provided on the bottom spacer 1100D of ribbon section 602D.

In at least one preferred embodiment, physical alignment feature 506 is a symmetrically convex bump. Bottom spacer 1100A provides a mating concave dimple as physical alignment feature 1102. Under appropriate circumstances, alternative physical alignment features may be preferred, such as, for example, a rectangle or asymmetrical polygon. A hole structure may also be provided to receive a protruding mating structure. In addition, the physical alignment features (specifically the protruding structures) may extend beyond a single layer in height. It is of course realized that holes or structures which intrude upon the light guides 202 of the layers will be removed in a subsequent fabrication step.

As shown, top spacer 620B mates with bottom spacer 1100C, and top spacer 620A mates with bottom spacer 1100B. In addition, in at least one embodiment, the output ends 606 of light guides 202 are in substantially contiguous parallel contact. It is understood and appreciated that the light guides are cladded light guides. In other words, it is understood and appreciated that the light guide cores are not in contact with one another; rather, it is the cladded outer surfaces that are in contact.

FIG. 11 depicts more clearly the bonding agent 1116 (such as glue, for example) that bonds light guides 202, top spacer 620 and bottom spacer 1100 of each layer together. For illustrative purposes, light guides 202 are represented as optical fibers. As shown, optical fiber 1104 is in intimate contact with optical fiber 1106, lying to the left, and optical fiber 1108, lying to the right. In other words, in at least one embodiment, the output ends 606 of individual light guides lie next to one another and are in actual contact, touching along their outer surfaces at a point. Physical alignment features 506, 1102 ensure desired alignment between output ends 606 of each stacked ribbon section 602. Bump and dimple alignment features 506, 1102 may be preferred in certain embodiments as they may be easily fabricated and promote rapid alignment during fabrication.

Moreover, by establishing alignment holes 402A, 402B, 404A, 404B and alignment features 506A~C and 1102A~C through automated fabrication processes, significant consistency and tolerance factors may be advantageously maintained. As each light guide 202 may be verified for integrity before significant fabrication processing commences, the number of defective LGS 100 components may be significantly reduced.

As ribbon sections 602 are stacked to provide LGS 100, the magnifying output ends 606 are bonded together with a suitable bonding agent such as, glue. Likewise, input ends 604, shown in FIG. 10, are also bonded together with a suitable bonding agent such as glue. When an appropriate number of ribbon sections 602 have been stacked to provide a desired viewing surface 104, shown in FIG. 1, the alignment holes at input end 604, shown in FIG. 6, are trimmed off; thereby exposing unobstructed aligned input ends for each light guide 202.

With reference now to FIGS. 10 and 11, the properties of magnification provided in at least one fabricated embodiment of an LGS 100 may be further illustrated. In the embodiment shown, top spacer 620 and bottom spacer 1100 provide vertical spacing 1110 between the center point "x" of each magnifying output end 606 that is about the same as the center to center spacing 1112 of each magnifying output ends 606 in the horizontal direction. In addition, in at least one embodiment, the center to center spacing 1112 is substantially identical to horizontal dimension 1118 of each output end 606.

In such a configuration, the top and bottom spacers 620, 1100 provide apparent vertical magnification that is substantially the same as the horizontal magnification provided by each magnifying output end 606. In at least one embodiment, each magnifying output end 606 represents a display pixel.

The viewing surface of LGS 100 is largely composed of display pixels. In at least one embodiment, each display pixel is based upon the magnifying output end 606 of each light guide 202. FIG. 10 shows a pixel 1014 on the input end 604 (bounded by the dotted lines.) As shown in FIG. 11, a pixel 1114 on the output end 606 (bounded by dotted line) includes a portion of top spacer 620 and bottom spacer 1100.

Figure 12:
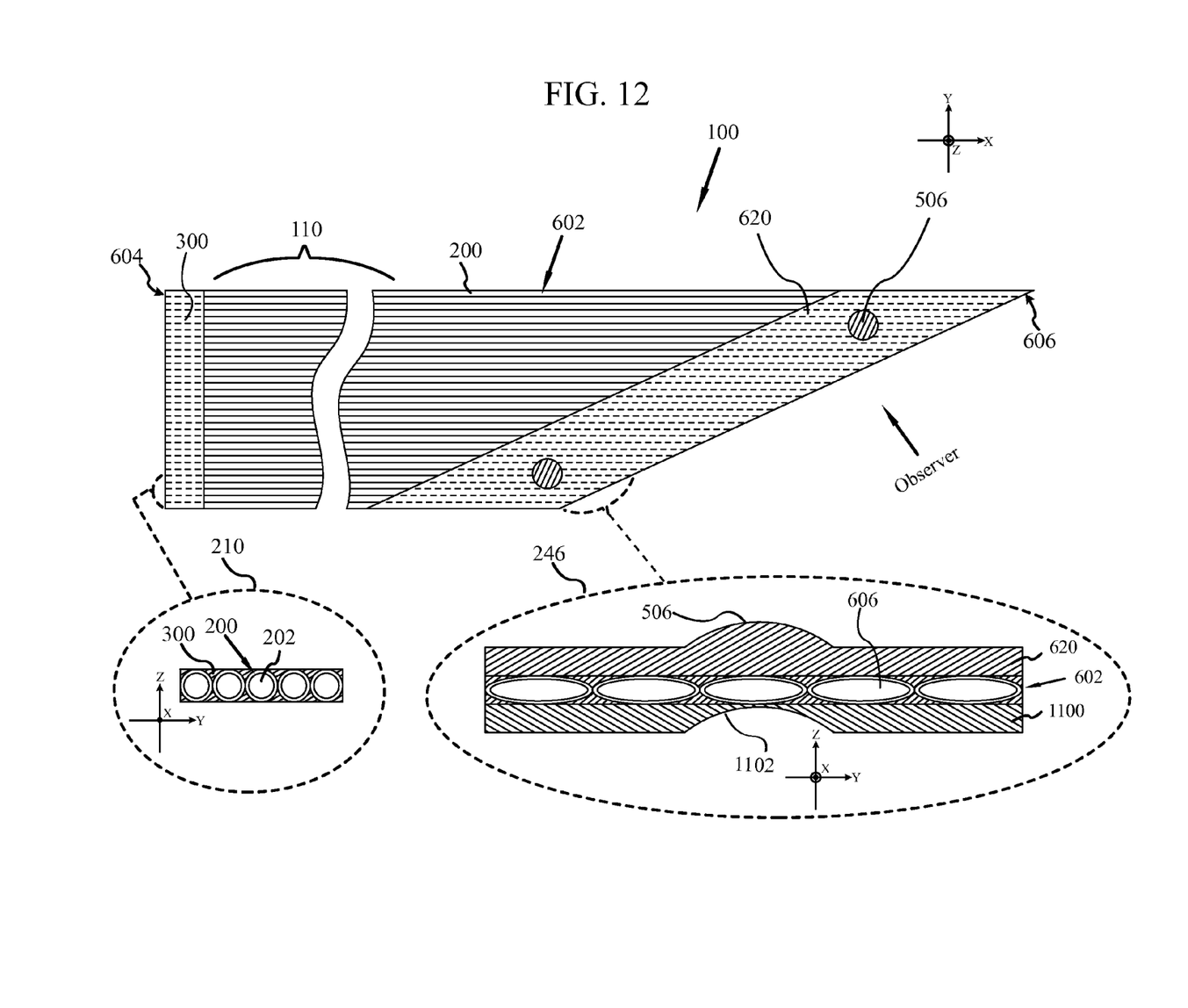
FIG. 12 is a top view of an assembled light guide screen.

Pixels 1014 in FIG. 10 and 1114 in FIG. 11 as drawn conceptually show that the pixel 1014 is magnified to pixel 1114. In alternative embodiments, the top and bottom spacers 620, 1100 may provide more or less spacing, thus providing more or less vertical magnification. In at least one embodiment, the light guides 202 may each be one-hundred micrometers in diameter. In at least one embodiment, the light guides 202 are tightly packed such that the perpendicular distance, center to center, between adjacent light guides 202, shown as inset 210 in FIG. 12, is about one-hundred micrometers. In such an embodiment, the thickness for each top and bottom spacer 620, 1100, shown in FIG. 11, may be four-hundred and fifty micrometers in thickness. The angle of the cut on the output ends 606, shown in FIG. 12, is about five degrees (5°). This embodiment provides an isotropic magnification of about ten (10).

FIG. 12 illustrates an enlarged top view of LGS 100 composed of fabricated ribbon section 602. More specifically, this top view shows a layer 102 composed of a plurality of light guides 202. Input ends 604 are aligned and square. Output ends 606 are angled to provide magnification. Flexible midsection 110 permits the aligned output ends 606 to be oriented differently from input ends 604.

Figure 13:
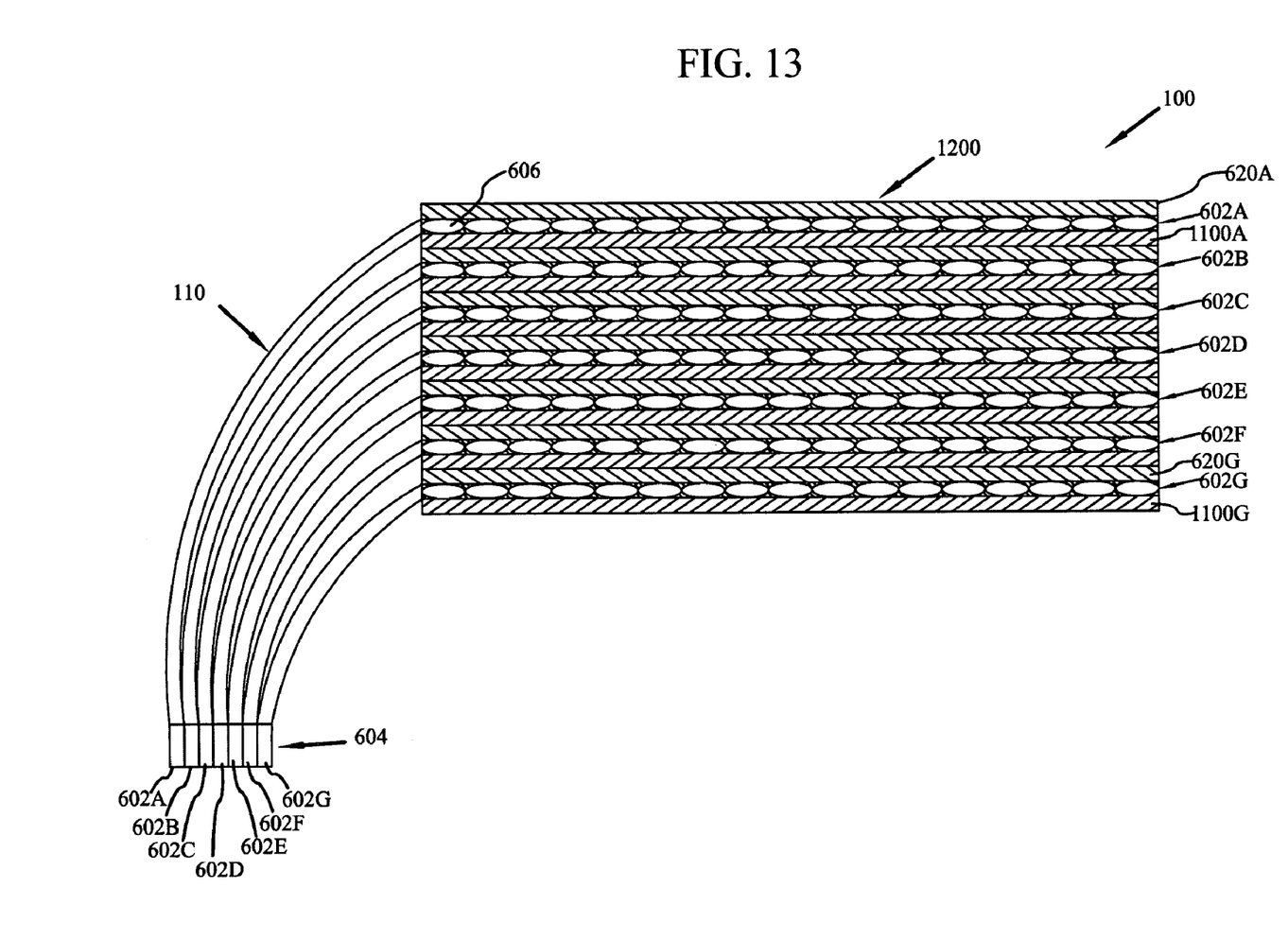
FIG. 13 is a partial front view of the stacked layer in a fabricated light guide screen.

FIG. 13 is an enlarged portion of fabricated LGS 100, showing ribbon sections 602A~602G, top spacers 620A~620G and bottom spacers 1100A~1100G providing viewing surface 1300. The number labels for top spacers 620B~620F and bottom spacers 1100B~1100F have been omitted, but may be inferred. The flexible midsections 110 permit aligned input ends 604 be oriented differently from viewing surface 1300.

The ribbon sections 602 are shown in FIG. 13 as vertically continuous across the screen. In at least one vertically aligned embodiment, there are at least 1920 aligned ribbon sections 602, each having at least 1080 light guides 202, forming a screen with 1920 ×1080 resolution. In an alternative embodiment where the ribbon sections 602 are horizontally continuous across the screen (not shown), there are at least 1080 aligned ribbon sections 602, each having at least 1920 light guides 202, again forming a screen with 1920×1080 resolution.

In the figures provided, it is understood and appreciated that the light guides, top spacers, bottom spacers, physical alignment features, bonding glues and other components are drawn in an exaggerated scale for ease of discussion. In addition, the conventions of vertical and horizontal are used with reference to the orientation of the elements within each figure, for ease of discussion.

Changes may be made in the above methods, systems and structures without departing from the scope thereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method of making a self-aligned light guide screen comprising:
    providing a first ribbon section of light guides, the light guides lying side by side in a first plane and defining a perimeter of the first ribbon section perpendicular to the first plane, the first ribbon section having at least one self alignment feature within the perimeter;
    providing a second ribbon section of light guides, the light guides lying side by side in a first plane and defining a perimeter of the second ribbon section perpendicular to the first plane, the second ribbon section having at least one self alignment feature within the perimeter and configured to mate with the at least one self alignment feature of the first ribbon section; and
    stacking the first and second ribbon sections, the self alignment features aligning the first and second ribbon section.

2. The method of claim 1, further comprising at least one spacer providing vertical spacing between stacked ribbon sections.

3. The method of claim 1, wherein the self alignment features are self locking features.

4. The method of claim 1, wherein the self alignment features are correspondingly-sized bump and dimple features.

5. The method of claim 1, wherein the self alignment features comprise self locking features.

6. The method of claim 1, wherein the self alignment features are provided on the top and bottom of each ribbon section.

7. The method of claim 1, wherein the self alignment features permit stacking multiple first and second ribbon sections.

8. The method of claim 1, wherein each ribbon section further comprises an input end, an output end and a longitudinal centerline therebetween, the output end forming a line that is aligned at an angle between about 0 and 90 degrees relative to the longitudinal centerline.

9. The method of claim 1, wherein each ribbon section further comprises a flexible midsection.

10. The method of claim 1, wherein a plurality of first and second ribbon sections are made prior to stacking the ribbon sections.

11. A method of making a self-aligned light guide screen comprising:
    providing a first ribbon section of light guides with an input end and an output end, the light guides lying side by side in a first plane and defining a perimeter of the first ribbon section perpendicular to the first plane, and at least one physical alignment feature disposed adjacent to each end within the perimeter;
    providing a second ribbon section of light guides with an input end and an output end, the light guides lying side by side in a first plane and defining a perimeter of the second ribbon section perpendicular to the first plane, and at least one physical alignment feature disposed adjacent to each end within the perimeter, the at least one physical alignment feature disposed adjacent to the output end configured to mate with the at least one self alignment feature disposed adjacent to the output end of the first ribbon section; and
    stacking the ribbon sections, the alignment features aligning the first and second ribbon sections.

12. The method of claim 11, further comprising at least one spacer disposed adjacent to each output end, providing vertical spacing between stacked ribbon sections.

13. The method of claim 12, wherein the at least one spacer further comprises the at least one alignment feature.

14. The method of claim 12, wherein the at least one spacer is bonded to the ribbon.

15. The method of claim 11, wherein the self alignment features comprise correspondingly-sized bump and dimple features.

16. The method of claim 11, wherein the self alignment features comprise self locking features.

17. The method of claim 11, wherein the self alignment features are provided on the top and bottom of each ribbon section.

18. The method of claim 11, wherein the self alignment features permit stacking multiple ribbon sections.

19. The method of claim 11, wherein the alignment of the input end matches to the alignment of the output end.

20. The method of claim 11, wherein each ribbon section further comprises a flexible midsection.

21. The method of claim 11, wherein each ribbon section further comprises a longitudinal centerline, the output end of each ribbon section forming a line that is aligned at an angle between about 0 and 90 degrees relative to the longitudinal centerline.

22. A method of making a self-aligned light guide screen comprising:
providing a ribbon of light guides in a first plane, the ribbon having a first end, a second end and a longitudinal centerline, the light guides defining a perimeter of the ribbon perpendicular to the first plane;
establishing at least one alignment guide at each end and within the perimeter;
bonding at least a section of the light guides together between the ends to provide a bonded midsection, the bonded midsection providing at least one physical alignment feature within the perimeter;
cutting the ribbon through the bonded midsection, the cut providing two ribbon sections each having a perimeter defined by the light guides and at least one alignment guide proximate to a first end and within the perimeter, and at least one physical alignment feature proximate to the cut end and within the perimeter; and
stacking one ribbon section upon the other, the physical alignment features aligning the cut ends, the alignment guides aligning the initial first end and initial second end.

23. The method of claim 22, wherein the two ribbon sections have substantially identical first ends and angled second ends and different lengths.

24. The method of claim 22, wherein the ribbon is cut through the bonded midsection at an angle of between about 0 and 90 degrees relative to the longitudinal centerline.

25. The method of claim 22, further comprising at least one spacer adjacent to the bonded area.

26. The method of claim 22, wherein cutting the ribbon divides the at least one physical alignment feature.

27. The method of claim 22, wherein a plurality of physical alignment features are provided symmetrically disposed to an intended cut line through the bonded midsection.

28. The method of claim 22, wherein the ribbon sections are horizontally aligned by the physical alignment features of the second ends and vertically aligned by the reference for alignment at the first ends.

29. The method of claim 22, wherein the reference for alignment at each end comprises set of holes.

30. The method of claim 22, wherein the alignment features comprise correspondingly sized bump and dimple features.

31. The method of claim 22, wherein the ribbon comprises a single layer of light guides, each light guide having an input end and an output end, the output ends in substantially contiguous parallel contact.

32. The method of claim 22, wherein the method is repeated, stacking subsequent ribbon sections upon earlier stacked ribbon sections.

33. The method of claim 22, wherein the ribbon is provided from a continuous source.

34. The method of claim 22, wherein the ribbon is provided from a continuous source of one or more supply reels.

35. The method of claim 22, wherein the ribbon is provided from a continuous source of an extrusion system.

36. The method of claim 22, wherein the ribbon is provided from a continuous source of an embossing system.

* * * * *